United States Patent [19]

Kataoka et al.

[11] Patent Number: 5,065,999
[45] Date of Patent: Nov. 19, 1991

[54] SHEET FEEDING DEVICE UTILIZING VIBRATION WAVES

[75] Inventors: Kenichi Kataoka; Yoshifumi Nishimoto, both of Yokohama; Masahiko Igaki; Eiichi Yanagi, both of Tokyo, all of Japan

[73] Assignee: Canon Kabushiki Kaisha, Tokyo, Japan

[21] Appl. No.: 482,918

[22] Filed: Feb. 22, 1990

[30] Foreign Application Priority Data

Feb. 28, 1989 [JP] Japan .................................. 1-47367

[51] Int. Cl.$^5$ .............................................. B65H 7/02
[52] U.S. Cl. .................................... 271/265; 271/8.1; 271/267; 73/584
[58] Field of Search ............... 271/193, 259, 258, 260, 271/262, 263, 8.1, 265, 267; 73/579, 584, 658; 198/609, 621

[56] References Cited

U.S. PATENT DOCUMENTS 3,603,680  9/1971  Barton .......................... 271/259 X
4,066,969  1/1978  Pearce et al. .................. 271/263 X
4,504,961  3/1985  Hariguchi ...................... 271/263 X

FOREIGN PATENT DOCUMENTS 0177243 10/1984 Japan .

Primary Examiner—D. Glenn Dayoan
Assistant Examiner—Tuan N. Nguyen
Attorney, Agent, or Firm—Fitzpatrick, Cella, Harper & Scinto

[57] ABSTRACT

There is disclosed a sheet feeding device having at least two vibration members pinching a sheet, which is frictionally driven by the travelling vibration waves generated in the vibration members. The device is further provided with a detector for detecting the state of vibration of the vibration members and generating a signal corresponding to the phase difference between the vibrations. The signal is used for correcting the vibration state of the vibrations members, thus significantly reducing the unevenness in the sheet feeding.

17 Claims, 3 Drawing Sheets

SHEET FEEDING DEVICE UTILIZING VIBRATION WAVES

BACKGROUND OF THE INVENTION

1. Field of the Invention

The present invention relates to a sheet feeding device adapted for use in computers, copying machines, printers, facsimile apparatus, word processors, typewriters or the like, and more particularly to a sheet feeding device utilizing a travelling vibration wave.

2. Related Background Art

A sheet feeding device utilizing travelling vibration wave has been already disclosed for example in the Japanese Laid-Open Patent Sho 59-177243. In said device, the sheet feeding is achieved by supporting a sheet between a pair of vibration members composed of an elastic material and pressed each other by a suitable pressure, and generating travelling vibration waves in said vibration members. On each vibration member there is adhered or pressed two groups of electromechanical energy converting elements such as piezoelectric elements, which are arranged with a phase difference of an odd multiple of $\lambda/4$ between said two groups, and, within each group, with a pitch of $\lambda/2$ and with alternating expansion-contraction polarity. One of said groups of piezo-electric elements on each vibration member is given an AC electric field of a frequency in the vicinity of specific frequencies of the vibration members (in practice the specific frequency of either vibration member), while the other of said groups of piezo-electric elements on each vibration member is given said AC electric field with a $\pi/2$ phase shift achieved by a $\pi/2$ phase shifter, thereby generating travelling vibration waves in said vibration members symmetrically with respect to the sheet feeding plane. A travelling vibration wave in each vibration member causes an elliptic movement in each point on a surface of said member opposite to the piezo-electric elements, and the sheet feeding is achieved by said elliptic movement of each point on mutually opposed faces of the vibration members, symmetric with respect to the sheet feeding plane, through friction between the sheet and the vibration members, and a change in the sheet feeding speed can be achieved for example by a change in the amplitude of the travelling vibration waves generated in the vibration members.

FIG. 3 schematically shows the principle of generating the sheet feeding force by such travelling vibration wave, in which a sheet 9 is pinched with a suitable pressure between vibration members 1, 5 in which travelling vibration waves are generated as illustrated. Each point on the surface of the vibration members 1, 5 moves generally along an elliptic trajectory. In the vibration member 1, when the travelling vibration wave moves to the right, as indicated by a white arrow, the surfacial point moves clockwise along said elliptic trajectory. As the travelling vibration waves generated in the vibration members 1, 5 mutually have a spatial phase difference of 180°, the projecting portions of said waves toward the sheet 9 always proceed with mutually opposed relationship. Since each point on such projecting portions moves in a direction opposite to the proceeding direction of the vibration waves in the members 1, 5, there is generated a sheet feeding force to the left, as indicated by a black arrow. In the recessed portions, there is generated a sheet feeding force in a direction the same as the proceeding direction of the travelling vibration waves, but such feeding force is weaker because of the smaller friction between the sheet and the vibration members resulting from a lower pressure in such recessed portions than in the projecting portions. Thus the total sheet feeding force is in a direction opposite to the proceeding direction of the travelling vibration waves.

However, in such conventional sheet feeding device, the travelling vibration waves are generated in both vibration members with AC voltages of a same phase even when the specific frequency of the vibration member varies individually for example by fluctuation in the sheet thickness or variation in the environmental conditions. Consequently a spatial phase aberration or deviation may be generated between the vibration waves of both vibration members as shown in FIG. 4, due to a change in the load or in the environmental conditions, thus resulting in a fluctuation in the sheet feeding amount.

SUMMARY OF THE INVENTION

An object of the present invention is to provide a sheet feeding device capable of stable sheet feeding despite of a change in the load or in the environmental conditions.

Another object of the present invention is to provide a sheet feeding device capable of stable sheet feeding, by maintaining the spatial phase difference constantly at zero between the travelling vibration waves generated in the vibration members supporting the sheet therebetween.

Still other objects of the present invention will become fully apparent from the following detailed description of the present invention.

According to an aspect of the present invention, the foregoing objects can be attained by a sheet feeding device, in which a sheet to be fed is supported by pinching between a pair of vibration members composed of an elastic material and respectively provided with electromechanical energy conversion means and electric power supply to the electromechanical energy conversion means of said paired vibration members is so controlled by power supply control means as to generate travelling vibration waves in said paired vibration members thereby feeding said sheet with thus generated vibration waves, wherein said power supply control means comprises a phase difference detecting unit for detecting the positional phase difference between the travelling vibration waves generated in said vibration members, and a control unit for controlling the phase difference in time between AC voltages supplied to the electromechanical energy conversion means of the vibration members in such a manner as to bring the phase difference detected by said phase difference detecting means to zero.

DESCRIPTION OF THE PREFERRED EMBODIMENTS

Figure 1:
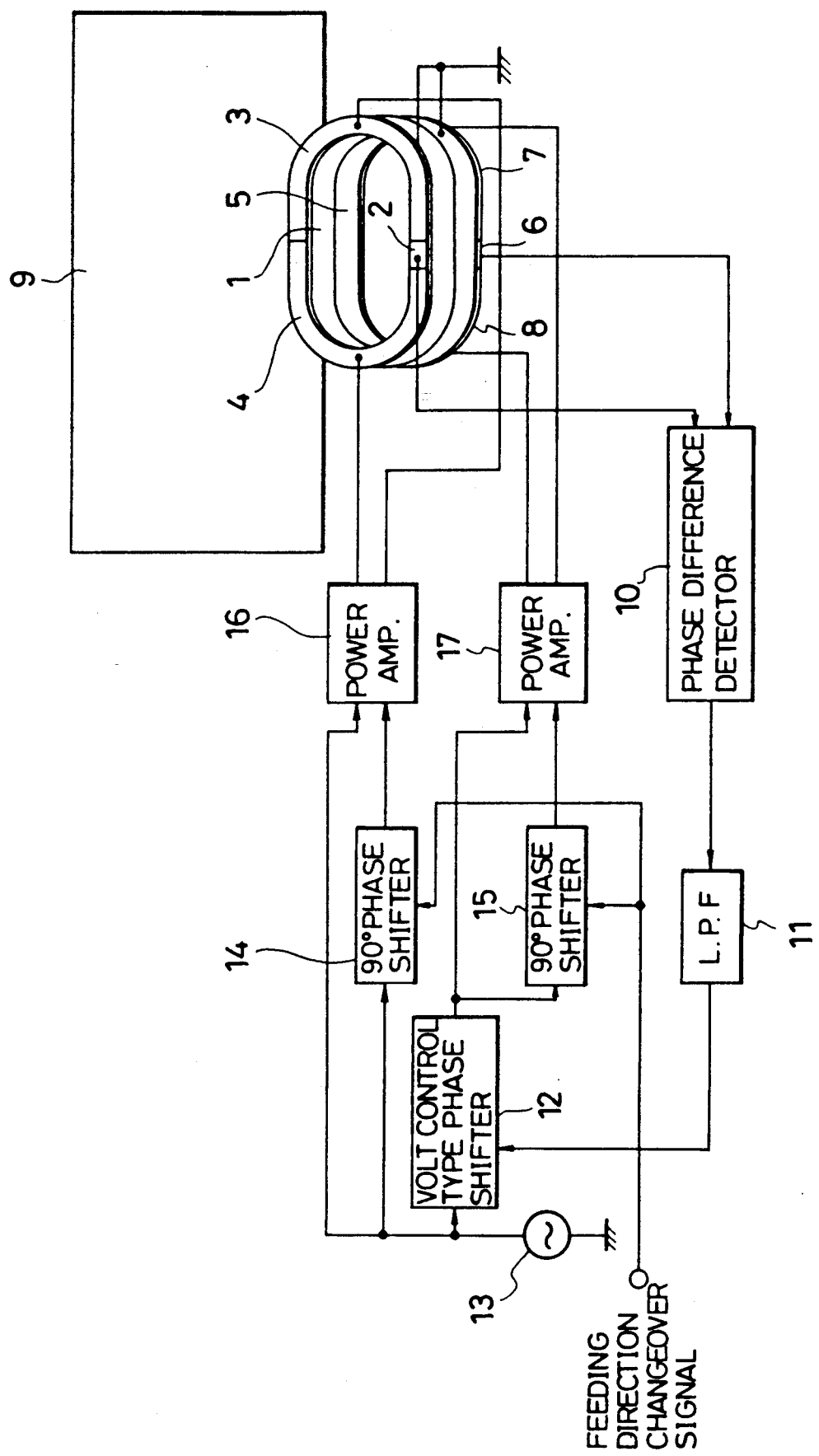
FIG. 1 is a block diagram of a first embodiment of the sheet feeding device of the present invention.

FIG. 1 is a block diagram of a first embodiment of the sheet feeding device of the present invention.

First and second metallic vibration members 1, 5 of an elongated circular shape with a certain thickness support a sheet 9 by pinching therebetween with a suitable pressure, and are respectively provided, on mutually distant faces thereof, with sections 3, 4, 7, 8 of two groups of piezo-electric elements which are polarized in already known manner, so as to generate, in each vibration member, two standing waves mutually different by $\lambda/4$ in position ($\lambda$ being wavelength of the vibration wave) or by 90° in time, thereby synthesizing a travelling vibration wave in each vibration member. Said first and second vibration members 1, 5 are electrically maintained at the ground potential. The first vibration member 1 is further provided with a detecting piezo-electric element 2 for detecting the vibration state of the travelling vibration wave generated in said first vibration member 2, and the second vibration member 5 is likewise provided with a detecting piezoelectric element 6 for detecting the state of the vibration wave in said second vibration member 5. There are further provided a known phase difference detector 10 for detecting the phase difference in time, at a same spatial position, of the travelling vibration waves generated in the first and second vibration members 1, 5 from the output signals of the detecting piezo-electric elements 2, 6; a known low-pass filter (LPF) 11 for amplifying and integrating the output of the phase difference detector 10; a known voltage-controlled phase shifter 12 for displacing the phase of the output signal of an oscillator 13 to be explained later, according to the output signal of the low-pass filter 11; an oscillator 13 for generating a reference signal for AC voltages to be applied to the sections 3, 4, 7, 8 of the piezoelectric elements for forming the travelling vibrations waves in the vibration members 1, 5; a first 90° phase shifter 14 for shifting the phase of the reference signal from the oscillator 13 by +90° or −90° according to a feeding direction switch signal from an unrepresented means for setting the sheet feeding direction; a second 90° phase shifter 15 for shifting the output of the voltage-controlled phase shifter 12 by +90° or −90° according to said feeding direction switch signal; and power amplifiers 16, 17 for amplifying the output signals of the oscillator 13 and the first 90° phase shifter and those of the voltage-controlled phase shifter 12 and the second 90° phase shifter 15 with suitable gains for supply to the sections 3, 4; 7, 8 of the piezo-electric elements.

Figure 3:
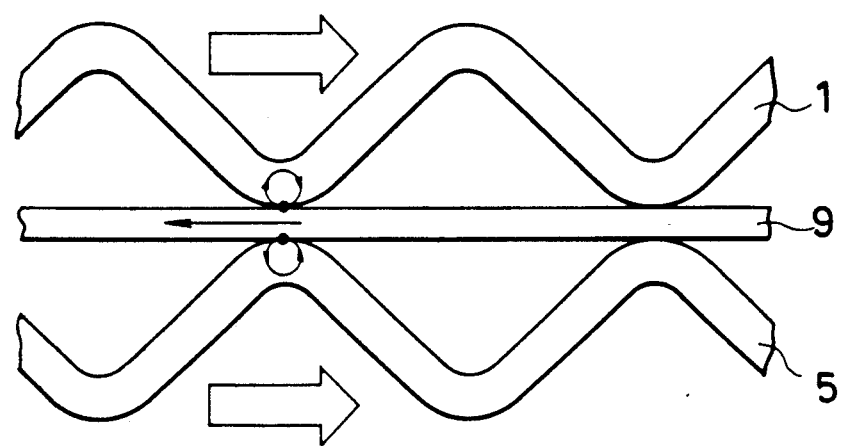
FIG. 3 is a schematic view showing the working principle of the sheet feeding device.
Figure 4:
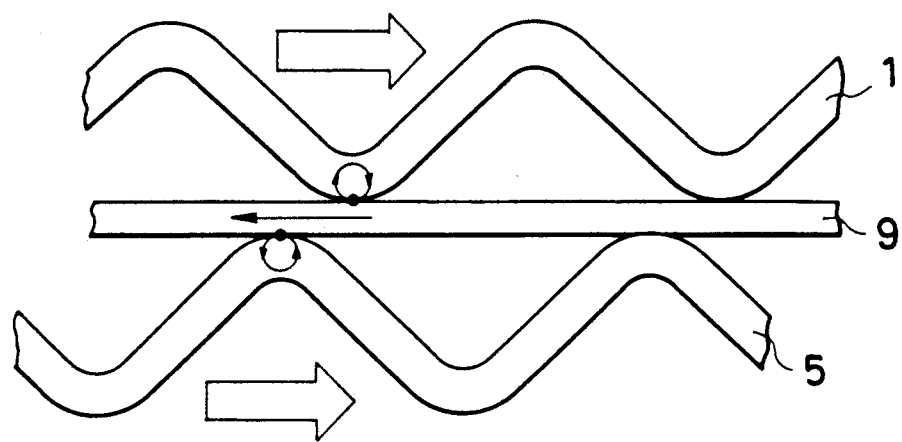
FIG. 4 is a schematic view showing a spatial phase aberration between the travelling vibration waves.

In the sheet feeding device of the present embodiment explained above, if the phase in time at a certain spatial point of the travelling vibration wave formed in the first vibration member 1 is delayed, as shown in FIG. 4, from the phase in time of the travelling vibration wave formed in the second vibration member 5 at a point opposed to the above-mentioned spatial point (it is assumed that the peaks of two travelling vibration waves mutually meet as shown in FIG. 3 in case of zero phase difference in time), the phase of the output signal of the detecting piezo-electric element 2 for detecting the vibration state of the first vibration member 1 is delayed from that of the output signal of the detecting piezo-electric element 6 for the second vibration member. Thus the phase detector 10 provides a negative output signal, and the output signal of the low-pass filter 11 decreases. Consequently the output of the voltage-controlled phase shifter 12 is delayed in phase, so that the AC voltages applied to the piezo-electric element sections 7, 8 of the second vibration member 5 are also delayed in phase. Thus the phase in time of the travelling vibration wave formed in the second vibration member 5 is delayed until the peaks of said vibration wave match those of the vibration wave formed on the first vibration member 1, as shown in FIG. 3.

Figure 2:
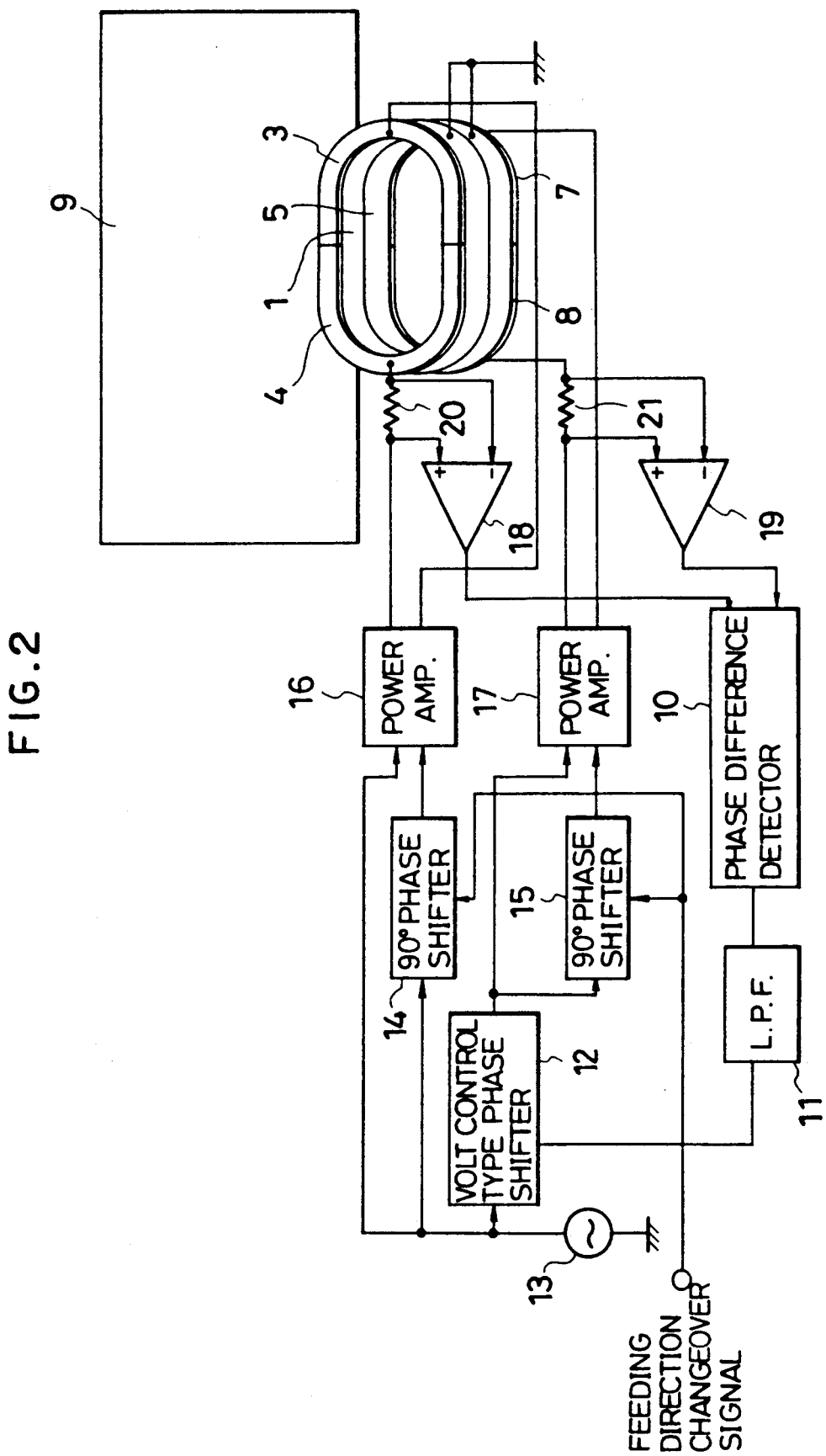
FIG. 2 is a block diagram of a second embodiment.

FIG. 2 is a block diagram of a second embodiment of the sheet feeding device of the present invention, wherein same components as those in the foregoing first embodiment are indicated by same numbers and will not be explained further.

In FIG. 2 there are provided differential amplifiers 18, 19 for respectively detecting the currents flowing into the driving piezo-electric section 4 of the vibration member 1 and the driving piezo-electric section 8 of the second vibration member 5 by amplifying the voltages across resistors 20, 21. In contrast to the foregoing first embodiment in which the phase difference detector 10 is given signals from the detecting piezo-electric elements 2, 6, said phase difference detector 10 in the second embodiment is given the output signals of the differential amplifiers 18, 19.

More specifically, in the foregoing first embodiment, the vibration members 1, 5 are provided with detecting piezo-electric elements 2, 6 for detecting the vibration states of said vibration members, and the control is made in such a manner as to maintain a constant relationship between the phases of two detected signals. In the present embodiment, the in-flowing currents at the application of AC voltages to the piezo-electric sections of the vibration members are detected by the differential amplifiers 18, 19, and the phase difference between the AC voltages applied to the driving piezo-electric sections are so controlled as maintain zero phase difference between the currents flowing into said driving piezo-electric sections.

As explained in the foregoing, the present invention allows to maintain zero spatial phase difference between the travelling vibration waves formed in a pair of vibration members supporting a sheet therebetween, even when said phase are affected for example by a change in the specific frequency of said vibration members resulting from a fluctuation in the thickness of said sheet or a change in the environmental conditions, thereby significantly reducing the unevenness in the sheet feeding. It is therefore rendered possible to improve the efficiency of sheet feeding, and to obtain fine beautiful image printing when applied for example to a facsimile apparatus.

In the foregoing embodiments, it is assumed that the spatial phases of vibration waves in the first and second vibration members are affected by the fluctuation in the thickness of sheet or in the environmental conditions. However, if such fluctuation affects the spatial phases of the vibration of only one vibration member, it is also possible to detect the vibration wave of such affected vibration member only, thereby determining the aberration of said vibration wave from the reference position and to regulate the phase of the vibration wave of said affected vibration member according to the detected amount of aberration.

What is claimed is:

1. A feeding device for a sheet, comprising:
    (a) first vibration means so arranged as to frictionally contact the sheet;

(b) second vibration means opposed to said first vibration means across said sheet and so arranged as to frictionally contact said sheet;
(c) first electromechanical conversion means for generating a first travelling vibration wave on said first vibration means in response to a first applied electrical signal;
(d) second electromechanical conversion means for generating a second travelling vibration wave on said second vibration means in response to a second applied electrical signal;
(e) first detecting means for generating a first electrical signal corresponding to the state of said first travelling vibration wave;
(f) second detecting means for generating a second electrical signal corresponding to the state of said second travelling vibration wave; and
(g) changing means for detecting the phase difference between said first and second electrical signals and changing the phase of at least one of said first and second applied electrical signals according to said detected phase difference in order to coincide the phase between the vibration wave generated in the first vibration means and that in the second vibration means.

2. A feeding device according to claim 1, wherein said first detecting means is provided on said first vibration means.

3. A feeding device according to claim 2, wherein said second detecting means is provided on said second vibration means.

4. A feeding device according to claim 3, wherein said second detecting means is provided in a position on said second vibration means spatially corresponding to the position of said first detecting means on said first vibration means.

5. A feeding device according to claim 1, wherein said first vibration means consists of an elongated circular-shaped elastic member having a straight portion therein.

6. A feeding device according to claim 5, wherein said second vibration means consists of an elongated circular-shaped elastic member having a straight portion therein.

7. A feeding device according to claim 6, wherein said sheet is so arranged as to be pinched between the straight portion of said first vibration means and the straight portion of said second vibration means.

8. A feeding device according to claim 4, wherein each of said first and second detecting means includes a piezoelectric element.

9. A feeding device for a sheet, comprising:
(a) first vibration means so arranged as to frictionally contact the sheet;
(b) second vibration means opposed to said first vibration means across said sheet, and so arranged as to frictionally contact said sheet;
(c) first electromechanical conversion means for generating a first travelling vibration wave on said first vibration means in response to a first applied electrical signal;
(d) second electromechanical conversion means for generating a second travelling vibration wave on said second vibration means in response to a second applied electrical signal;
(e) first detecting means for generating a first detection signal corresponding to the electrical phase of said first applied electrical signal;
(f) second detecting means for generating a second detection signal corresponding to the electrical phase of said second applied electrical signal; and
(g) changing means for detecting the phase difference between said first and second detection signals, and changing the phase of at least one of said first and second applied electrical signals according to said detected phase difference in order to coincide the phase between the vibration wave generated in the first vibration means and that in the second vibration means.

10. A feeding device for a sheet, comprising:
(a) first vibration means so arranged as to frictionally contact the sheet;
(b) second vibration means opposed to said first vibration means across said sheet and so arranged as to frictionally contact said sheet;
(c) first electromechanical conversion means for generating a first travelling vibration wave on said first vibration means in response to a first applied electrical signal;
(d) second electromechanical conversion means for generating a second travelling vibration wave on said second vibration means in response to a second applied electrical signal;
(e) first detecting means for generating a first control signal corresponding to the state of said first travelling vibration wave;
(f) second detecting means for generating a second control signal corresponding to the state of said second travelling vibration wave; and
(g) changing means for detecting the phase difference between said first and second control signals and changing the phase of at least one of said first and second travelling vibration waves according to said detected phase difference in order to coincide the phase between the vibration wave generated in the first vibration means and that in the second vibration means.

11. A feeding device according to claim 10, wherein said first detecting means is provided on said first vibration means.

12. A feeding device according to claim 11, wherein said second detecting means is provided on said second vibration means.

13. A feeding device according to claim 12, wherein said second detecting means provided in a position on said second vibration means spatially corresponding to the position of said first detecting means on said first vibration means.

14. A feeding device for a sheet, comprising:
(a) a first vibration member for generating a first travelling vibration wave thereon in response to an applied electrical signal;
(b) a second vibration member opposed to said first vibration member across said sheet and adapted for generating a second travelling vibration wave thereon in response to an applied electrical signal, said first and second travelling vibration waves causing a movement of said sheet;
(c) detecting means for detecting the state of the travelling vibration wave in at least one of said vibration members, and generating a control signal corresponding to the amount of aberration from a predetermined spatial position; and
(d) correcting means for correcting the spatial position of the travelling vibration wave of said vibration members in response to the control signal from said detecting means in order to coincide the phase between the vibration wave generated in the first vibration member and that in the second vibration member.

15. A feeding device for a sheet, comprising:
(a) a first vibration member for generating a first travelling vibration wave thereon in response to an applied electrical signal;
(b) a second vibration member opposed to said first vibration member across said sheet and adapted for generating a second travelling vibration wave in response to an applied electrical signal, said first and second travelling vibration waves causing a movement of said sheet;
(c) detecting means for detecting the state of the travelling vibration wave in at least one of said vibration members and generating a control signal corresponding to the amount of aberration from a predetermined spatial position; and
(d) correcting means for correcting the spatial position of the travelling vibration wave of said one vibration member in response to the control signal from said detecting means in order to coincide the phase between the vibration wave generated in the first vibration member and that in the second vibration member.

16. A feeding device for a sheet, comprising:
(a) a first vibration member for generating a first travelling vibration wave thereon in response to an applied electrical signal;
(b) a second vibration member opposed to said first vibration member across said sheet and adapted for generating a second travelling vibration wave thereon in response to an applied electrical signal, said first and second travelling vibration waves causing a movement of said sheet;
(c) detecting means for detecting the state of the travelling vibration wave in at least one of said vibration members, and generating a control signal corresponding to the degree of deviation from a predetermined spatial position at a certain time; and
(d) correcting means for correcting the spatial position of the travelling vibration waves of said vibration members in response to the control signal from said detecting means in order to coincide the phase between the vibration wave generated in the first vibration member and that in the second vibration member.

17. A sheet feeding device, comprising:
(a) a vibration member for generating a travelling vibration wave to feed a sheet member, said vibration member having first and second vibration elements provided in positions for pinching said sheet member; and
(b) means for varying the phase difference between the vibration wave generated in the first vibration element and that in the second vibration element according to a change in the feeding speed of said sheet member in order to coincide the phase between the vibration wave generated in the first vibration element and that in the second vibration element.

* * * * *

UNITED STATES PATENT AND TRADEMARK OFFICE
CERTIFICATE OF CORRECTION

PATENT NO. : 5,065,999
DATED : November 19, 1991
INVENTOR(S) : Kenichi Kataoka et al.

It is certified that error appears in the above-identified patent and that said Letters Patent is hereby corrected as shown below: Title Page:

[56] REFERENCES CITED:

U.S. PATENT DOCUMENTS

"Hariguchi" should read --Horiguchi--.

[57] ABSTRACT:

Line 9, "vibrations" should read --vibration--.

COLUMN 2:

Line 25, "of" should be deleted.

COLUMN 3:

Line 51, "4;" should read --4,--.

COLUMN 4:

Line 45, "are" should read --is--.

Signed and Sealed this

Thirteenth Day of April, 1993

Attest:

STEPHEN G. KUNIN

Attesting Officer    Acting Commissioner of Patents and Trademarks